Nov. 21, 1961  R. E. MEYER ET AL  3,009,317
HIGH ENERGY FUEL AFTERBURNER SYSTEM
Filed April 20, 1960  2 Sheets-Sheet 1
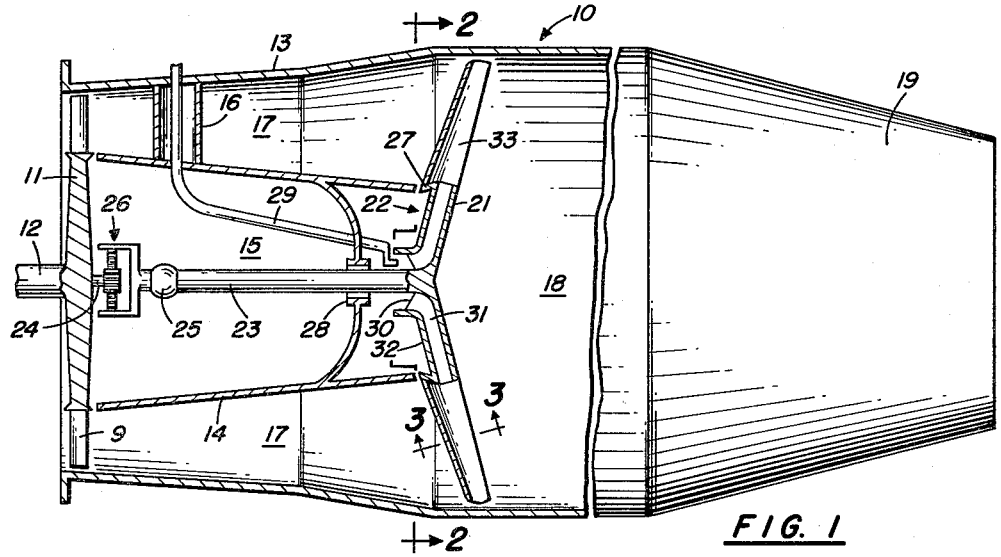
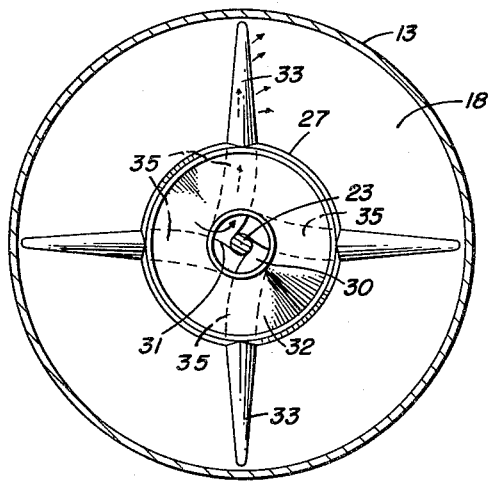
FIG. 2
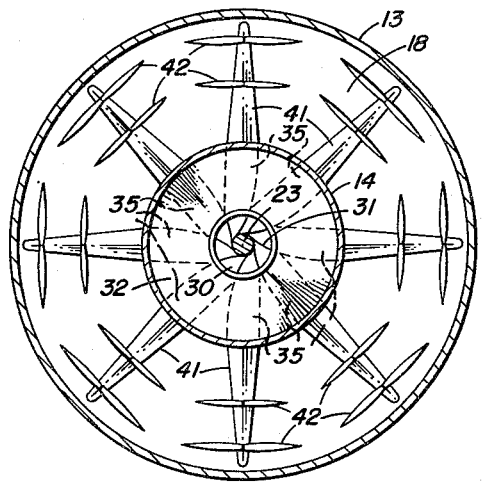
FIG. 5
Inventors
ROBERT E. MEYER
GEORGE D. LEWIS
By R. I. Tompkins
Attorney Nov. 21, 1961  R. E. MEYER ET AL  3,009,317
HIGH ENERGY FUEL AFTERBURNER SYSTEM
Filed April 20, 1960

Inventors
ROBERT E. MEYER
GEORGE D. LEWIS

By R. J. Tompkins
Attorney

United States Patent Office 3,009,317
Patented Nov. 21, 1961

3,009,317
HIGH ENERGY FUEL AFTERBURNER SYSTEM
Robert E. Meyer, Jupiter, and George D. Lewis, North Palm Beach, Fla., assignors, by mesne assignments, to the United States of America as represented by the Secretary of the Navy
Filed Apr. 20, 1960, Ser. No. 23,571
7 Claims. (Cl. 60—35.6)

This invention relates to fuel distributing systems and more particularly to apparatus for uniformly distributing high energy fuel in the afterburner combustion chamber of a turbojet engine.

Acceptable combustion efficiency in conventional type fuel distribution systems has previously been achieved by a network of small lines to provide uniform fuel distribution or an equivalent of such a network, as for example, rotating small diameter nozzles which spread fuel more or less evenly through the afterburner combustion chamber. Although such devices serve the purpose under normal operating conditions they prove unsatisfactory when certain high energy fuels are supplied to an afterburner fuel system. These fuels have physical characteristics that prohibit or restrict the use of contemporary fuel distribution means. Some of these fuels tend to decompose while undergoing a nominal temperature rise such as can be experienced in a contemporary fuel distribution system. This decomposition can form solids tending to clog a fuel line and especially a small fuel orifice.

It is desirable, therefore, to use large diameter lines plus high flow velocities to reduce formation of solids and line clogging respectively. This invention disclosure describes apparatus which achieves acceptable fuel distribution without the use of small diameter lines or small individual fuel nozzles.

The general purpose of this invention, therefore, is to provide an afterburner fuel supply system which will not clog when high energy fuels are used. The system provides for uniform distribution of fuel as well as providing for a stable flame front in the afterburner section. Such stability is provided by the supply system which also acts as a flameholder. The uniform nonclog distribution is achieved by a unique rotating impeller means which is so arranged that the need for outboard bearing surfaces is precluded. Such bearing surfaces would present an intolerable maintenance problem since they would be located adjacent the flameholder and therefore subject to exceedingly high temperatures. The present arrangement additionally distributes fuel from a central source without using enclosed vessels or conduits which contact the high temperature segments of the fuel distributing means. Thorough mixing of distributed fuel and exhaust gases is obtained by two unique means as pointed out in the main body of the specification. Such mixing provides for maximum burning efficiency under given operating conditions.

An object of the present invention is the provision of an afterburner fuel distributing system which is suitable for supplying high energy fuel in the afterburner of a turbo-compressor power plant.

Another object of the invention is to provide a stable flame front in an afterburner section without the need for separate fuel supply means and flame holder means.

A further object of the invention is the provision of means in a rotating fuel distributor to eliminate the need for outboard bearing surface maintenance.

Still another object is to provide means for mixing fuel with exhaust gases to obtain efficient aferburner operation.

Other objects and many of the attendant advantages of this invention will be readily appreciated as the same becomes better understood by reference to the following detailed description when considered in connection with the accompanying drawings wherein:

FIG. 1 shows a schematic side elevation, partly in section of a preferred embodiment of the invention.

FIG. 2 shows a section of the device taken on the line 2—2 of FIG. 1 looking in the direction of the arrows.

FIG. 5 shows a section of the modified device taken on line 5—5 of FIG. 4 looking in the direction of the arrows.

Figure 4:
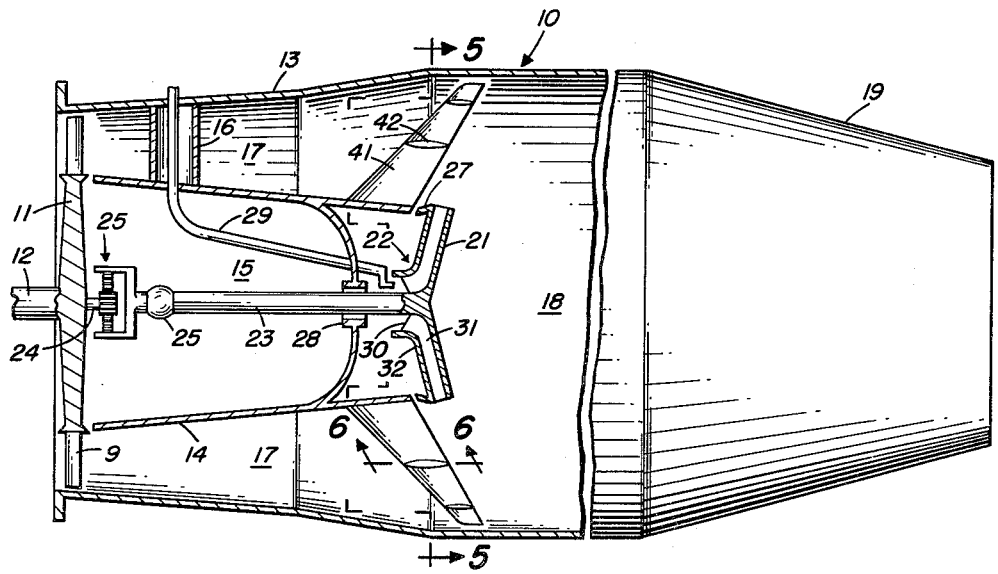
FIG. 4 shows a schematic side elevation, partly in section of a modification of the invention.

Referring now to the drawings, wherein like reference characters designate like or corresponding parts throughout the several views, there is shown in FIG. 1 the exhaust duct portion 10 of a gas turbine jet engine. In the forward portion of the duct portion 10 a turbine wheel 11 is located in order that the invention might be oriented with respect to a typical engine's working parts. Turbine blades 9 are mounted on wheel 11. The wheel 11 of the turbine is coupled by a shaft 12 to a compressor rotor (not shown). The turbine discharges into an exhaust duct 10. The exhaust duct is defined by an outer duct wall 13. In the forward portion of the duct 10 there is an inner duct wall 14. Inner duct wall 14 is supported within outer wall 13 by braces such as that shown at 16 and forms an inner body 15. Exhaust gases flow in an annular passageway 17 formed by walls 13 and 14 and pass from this passageway into a combustion chamber 18 where the afterburning occurs. From the combustion chamber 18 exhaust gases flow through jet nozzle 19 into the atmosphere. The forward wall of the combustion chamber 18 is formed by the rear disc 21 of a rotary impeller 22. The rotary impeller acts to distribute fuel for afterburning and also acts to hold the afterburner flame stable within the combustion chamber. The rotating impeller is driven by a shaft 23 which is connected to a shaft 24 through a flexible coupling 25. The drive between the turbine wheel 12 and impeller 22 may be direct but speed reduction gearing 26 is shown. The impeller 22 is integral with shaft 23 and needs no outboard or rear support bearings. The reason for this is that rotational stability is achieved from a conical shaped surface 27 at the outer periphery of impeller 22. This surface forms a continuation of inner duct wall 14 and when shaft 23 is displaced from the rotational axis, surface 27 is acted upon by the turbo jet engine exhaust gases such that an alignment restoring force is generated. During reduced speeds and static conditions a high clearance bumper bearing 28 maintains approximate co-axial alignment.

Figure 3:
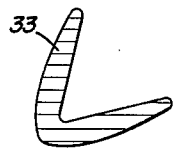
FIG. 3 is a section of the rotating mixing member taken on the line 3—3 of FIG. 1.

Fuel is supplied to impeller 22 through a large diameter fuel line 29. This line enters the eye 30 of impeller 22 adjacent shaft 23 where fuel is collected by vanes 31 which along with front shroud 32 and rear disc 21 form fluid passages 35 providing flow directing surfaces to distribute fuel to the outer periphery of impeller 22. The fuel is discharged from the periphery into rotating mixing members 33 which form open flow paths which are rearwardly and outwardly canted. FIG. 3 is a section of member 33 and illustrates the open flow path which is provided. This structure allows the moving exhaust gas stream to induce outward flow of the fuel.

Figure 6:
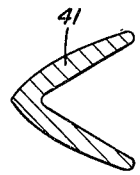
FIG. 6 shows a section of the fixed mixing member taken on line 6—6 of FIG. 4.

In FIGS. 4 through 6 another modification is shown which is identical to the preferred embodiment except that a stationary mixing means is provided rather than rotating mixing members 33. In FIG. 4 stator vanes 41 are shown located at the outer periphery of impeller 22 and supported by body 15. These members are rearwardly and outwardly canted to form unrestricted flow paths. See FIGS. 4 and 6. When the exhaust gas passes over a vane 41 fuel flowing in the open passageway will be induced to mix with the gases to provide a combustible afterburner mixture. FIG. 6 is a section of member 41 and illustrates the open flow passageway which is provided. Circumferential backwardly canted mixing arms 42 can be fixed to stator vanes 41 to improve mixing between the afterburner fuel and the exhaust gases.

The operation of the afterburner flameholder-fuel distributor is as follows: In the preferred embodiment as shown in FIGS. 1 through 3 high energy fuel is supplied through a large diameter fuel supply line 29 to the eye 30 of impeller 22. The rotary action of impeller 22 produces a centrifugal force on the fuel, forcing it to the outer periphery 27 and into rotary mixing member 33. The exhaust gas stream through passageway 17 induces the fuel in member 33 into the exhaust gases. This induction along with the rotary motion of member 33 assures uniform circumferential distribution of a combustible afterburner fuel mixture. The use of a rotating member transverse to, and submerged in, an oxidizing exhaust stream additionally provides a scheduled mixing of liquid, atomized or gaseous fuel with the exhaust gas stream. The rear disc 21 of impeller 22 acts as a flameholding means when using fuels such as conventional hydrocarbon fuels that require maintenance of a stable flame front.

The operation of the FIGS. 4 through 6 modification is similar to that of the apparatus of FIGS. 1 through 3 except that rotary mixing members 33 are replaced by stationary mixing means consisting of stator vanes 41 and mixing arms 42. The impeller's rotary motion is depended upon for uniform distribution of fuel to the mixing section. As in the apparatus of FIGS. 1 through 3 fuel is discharged from the periphery 27 of rotary impeller 22 into a region aft of or in the wake of the mixing members which aft region provides an unconduited outwardly directed flow path. Fuel is thus moved along these flow paths by a dynamically created turbulent gas wake which produces a pressure gradient along the flow paths sufficient to induce adequate fuel flow. In the FIGS. 4 through 6 modification greater mixing results from arms 42 being placed on stator vanes 41.

Obviously many modifications and variations of the present invention are possible in the light of the above teachings. It is therefore to be understood that within the scope of the appended claims the invention may be practiced otherwise than as specifically described.

What is claimed is:

1. In a jet power plant, an outer wall, an inner wall which forms an inner body, said outer wall and said inner wall forming an exhaust duct, a turbine wheel at the inlet to said duct, a flexible shaft connected to said turbine wheel extending within said inner body, bumper means within said inner body for supporting said shaft when it is at rest, a rotary impeller attached to the end of said shaft, fuel supply means discharging fuel into the eye of said rotary impeller, vanes within said impeller imparting radial distribution thereto, means attached at the periphery of said impeller to maintain alignment of said shaft with said turbine wheel's axis of rotation, means for mixing the fuel distributed by said impeller, said mixing means located radially of said impeller vanes and within said exhaust duct whereby high energy afterburner fuels are distributed without fouling the fuel distributing system.

2. In a jet power plant as claimed in claim 1 wherein said means for mixing fuel comprises an arm attached to said rotary impeller, said arm having an open end section.

3. In a jet power plant as claimed in claim 1 wherein said means for mixing fuel comprises a stator mounted between said outer wall and said inner wall having mixing arms formed integral therewith.

4. In a jet power plant, an outer wall, an inner wall which forms an inner body, said outer wall and said inner wall forming an exhaust duct, a turbine wheel at the inlet to said exhaust duct, a first shaft connected to said turbine wheel, gear reduction means connected to said first shaft, flexible coupling means connected to said gear reduction means, a second shaft connected to said flexible coupling means, bumper means within said inner body for supporting said second shaft when it is at rest, a rotary centrifugal impeller connected to said second shaft, fuel supply means discharging fuel into the eye of said impeller, a plurality of vanes within said impeller imparting radial distribution thereto, means attached at the outer periphery of said impeller to maintain alignment of said second shaft with said turbine wheel's axis of rotation, means for mixing fuel distributed by said impeller, said mixing means located radially of said impeller vanes and within said exhaust duct whereby high energy afterburner fuels are distributed without fouling the fuel distributing system.

5. In a jet power plant as claimed in claim 4 wherein said means to maintain alignment comprises a conical shaped surface which forms an axial continuation of said inner wall.

6. In a jet power plant as claimed in claim 4 wherein said means for mixing comprises a rotating arm attached to said rotary impeller, said arm having an open end section.

7. In a jet power plant as claimed in claim 4 wherein said means for mixing comprises a stator having an open end mounted between said outer wall and said inner wall and having mixing arms formed integral therewith.

References Cited in the file of this patent
UNITED STATES PATENTS
2,823,519  Spalding _____ Feb. 18, 1958